United States Patent

Funakawa

(10) Patent No.: US 10,116,813 B2
(45) Date of Patent: Oct. 30, 2018

(54) COMPOSITE APPARATUS

(71) Applicant: Konica Minolta, Inc., Tokyo (JP)

(72) Inventor: Hisataka Funakawa, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/812,379

(22) Filed: Nov. 14, 2017

(65) Prior Publication Data
US 2018/0159993 A1 Jun. 7, 2018

(30) Foreign Application Priority Data

Dec. 2, 2016 (JP) .................................. 2016-234892

(51) Int. Cl.
H04N 1/00 (2006.01)
G06F 3/14 (2006.01)

(52) U.S. Cl.
CPC ..... *H04N 1/00416* (2013.01); *H04N 1/00244* (2013.01); *H04N 1/00307* (2013.01); *H04N 1/00387* (2013.01); *H04N 1/00408* (2013.01); *G06F 3/1454* (2013.01); *H04N 2201/001* (2013.01); *H04N 2201/0094* (2013.01); *H04N 2201/3273* (2013.01)

(58) Field of Classification Search
USPC ........................................................ 358/1.15
See application file for complete search history.

(56) References Cited

U.S. PATENT DOCUMENTS

2014/0155121 A1* 6/2014 Haba .................. H04N 1/00129
455/557
2014/0340706 A1* 11/2014 Kondo .................. G06F 3/1253
358/1.15
2016/0004485 A1 1/2016 Sasase
(Continued)

FOREIGN PATENT DOCUMENTS

JP 2014-241494 A 12/2014
JP 2015-170049 A 9/2015
JP 2016-208140 A 12/2016

OTHER PUBLICATIONS

Masatoshi et al.,Image Forming Stystem, Sep. 28, 2015, Machine Translated Japanese Patent Application Publication, JP2015-170049 Listed on IDS, All Pages.*

(Continued)

Primary Examiner — Ngon Nguyen
(74) Attorney, Agent, or Firm — Osha Liang LLP

(57) ABSTRACT

A composite apparatus includes: a first apparatus and a second apparatus that operate independently; and a console display that is shared by the first and second apparatus. The first and second apparatus each includes: a display memory that stores display data; and a drawing processor that instructs the console display to display the display data. The composite apparatus further includes: a selector that selectively connects the drawing processor of the first or second apparatus to the console display; and a switch processor that receives a connection request from the first or second apparatus. The connection request includes requests to con- (Continued)

nect the drawing processor of the first or second apparatus to the console display and to instruct the selector to connect the drawing processor of either the first or second apparatus to the console display.

17 Claims, 14 Drawing Sheets

(56) References Cited

U.S. PATENT DOCUMENTS

2016/0219170 A1* 7/2016 Tomono ............. H04N 1/00469
2016/0286061 A1 9/2016 Saka

OTHER PUBLICATIONS

Toru, Printing System Screen Disply Device Image Processor Printing Device Control Method Thereof and Program, Aug. 12, 2016, Machine Translated Japanese Patent Application Publication, JP2016-208140 Listed on IDS, All Pages.*
Extended European Search Report in counterpart European Application No. 17 20 1830.1 dated Mar. 26, 2018 (11 pages).

* cited by examiner

COMPOSITE APPARATUS

The disclosure of Japanese Patent Application No. 2016-234892 filed on Dec. 2, 2016, including description, claims, drawings, and abstract, is incorporated herein by reference in its entirety.

BACKGROUND

Technological Field

The present invention relates to a composite apparatus that is provided with multiple apparatuses each being capable of operating independently, for example: an image forming apparatus such as a multi-function peripheral (MFP), i.e., a multifunctional digital machine; and an information processing apparatus such as a personal computers (PC).

Description of Related Art

It is common that, in addition to MFPs mainly for copying and printing, many information processing apparatuses for electronic data processing, such as servers, are also used in workplaces; it is also common that such an information processing apparatus and such an MFP are used together for composite processing.

To reduce the cost of the management and maintenance of apparatuses in an entire workplace, there is a suggestion to build one composite apparatus by consolidating multiple apparatuses each that are capable of operating independently, such as an image processing apparatus and an MFP, into one cabinet.

Since these apparatuses constituting one composite apparatus each are capable of operating independently, each of them can be, unsurprisingly, provided with its own console display means for a user to manipulate the apparatus, such as an operational panel that displays various types of display data such as operation screens.

One composite apparatus with multiple console display means, however, will never be useful for users. Furthermore, the multiple console display means, which are open to the outside of the composite apparatus, will occupy a large area of the surface of the composite apparatus, compromising the advantages of one composite apparatus that is constituted by multiple apparatuses.

Japanese Unexamined Patent Application Publication No. 2014-241494 discloses an information processing system that is capable of reducing the total man-hour count to develop an application that uses a function of an apparatus. An MFP has a genuine application and a third-party application both being installed thereon; the genuine application stores error screens each connected to a possible error and the third-party application stores no error screens. The MFP is provided with a display, an error sensor, a drawer, and a processor. The display displays a screen of an application that is currently active; the error sensor detects when an error occurs on the MFP. The drawer draws an error screen notifying of the detected error when the error occurs, the error screen being stored in the genuine application. If the error occurs while the third-party application is active, the processor switches the display data from that of the third-party application to that of the genuine application to show the error screen on the display.

However, according to Japanese Unexamined Patent Application Publication No. 2014-241494, this is a technique for causing one MFP to execute processing, not a technique relating to one composite apparatus that is constituted by multiple apparatuses each that are capable of operating independently.

So, the technique described in Japanese Unexamined Patent Application Publication No. 2014-241494 is still unable to resolve the following: one composite apparatus with multiple console displays will never be useful for users; and the multiple console displays will occupy a large area of the surface of the composite apparatus.

SUMMARY

One or more embodiments of the present invention provide one composite apparatus including: multiple apparatuses each being capable of operating independently; and one console display means for a user to manipulate these apparatuses.

According to one or more embodiments, a composite apparatus comprises:
- a first apparatus and a second apparatus each being capable of operating independently; and
- a console display being shared by the first apparatus and the second apparatus, the first apparatus and the second apparatus each including:
  - a display memory that stores display data to be displayed on the console display; and
  - a drawing processor that makes the console display show the display data stored on the display memory,
- the composite apparatus further including:
  - a selector that selectively connects the drawing processor of the first or second apparatus to the console display; and
  - a switch processor that receives a connection request from the first or second apparatus, the connection request requesting to connect the drawing processor of the first or second apparatus to the console display and that makes the selector connect the drawing processor of either the first or second apparatus to the console display, the either one having issued the connection request,
- wherein, while being connected to the console display, the drawing processor of either the first or second apparatus having issued the connection request makes the console display show the display data stored on the display memory.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to the disclosed embodiments.

Figure 1:
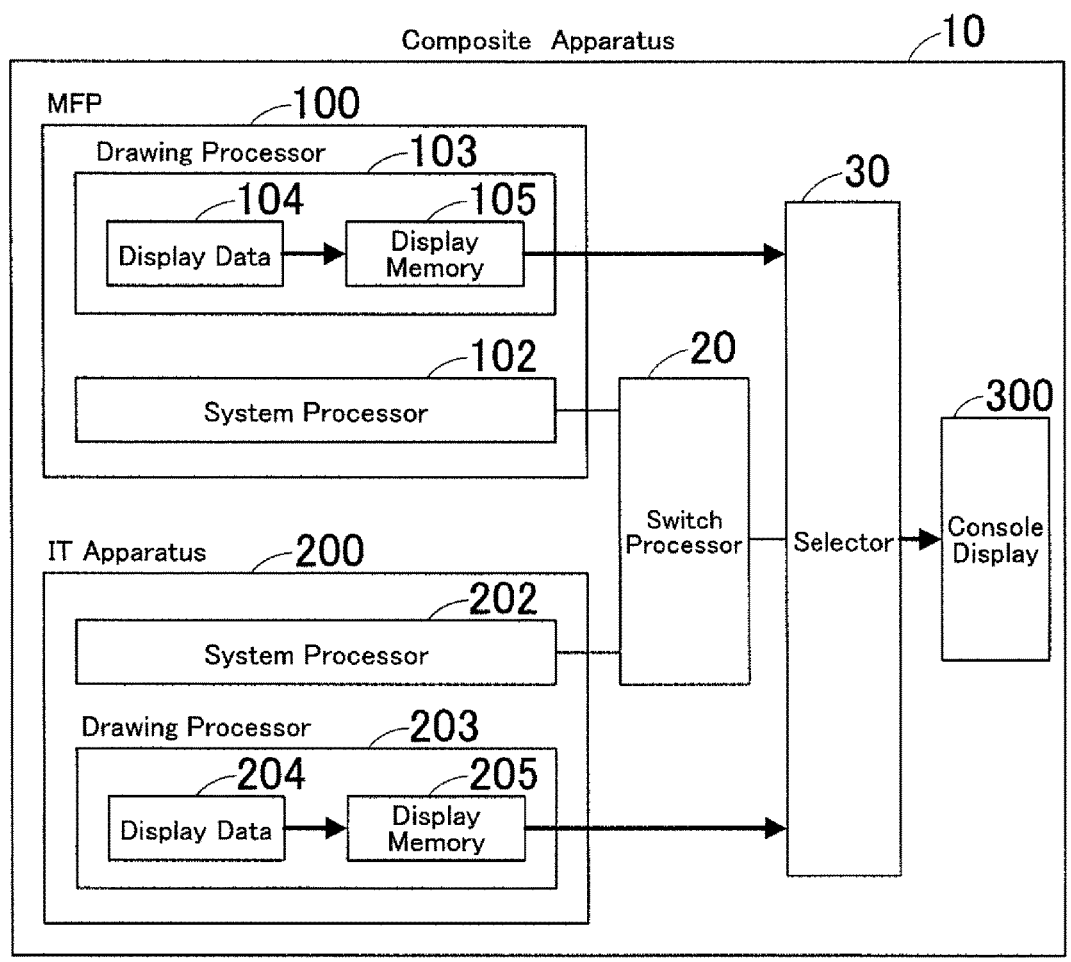
FIG. 1 is a block diagram illustrating the configuration of a composite apparatus according to one or more embodiments of the present invention.

FIG. 1 is a block diagram illustrating the configuration of a composite apparatus 10 according to one or more embodiments of the present invention. In one or more embodiments, an image forming apparatus 100 and an information processing apparatus 200, respectively, are constituted by an MFP and a PC each that are capable of operating independently. These are consolidated into one cabinet, constituting a composite apparatus 10. Hereinafter, the image forming apparatus 100 and the information processing apparatus 200 will also be referred to as MFP 100 and IT apparatus 200, respectively. The composite apparatus 10 is not necessarily constituted by the MFP 100 and the IT apparatus 200 both that are loaded in one cabinet; the composite apparatus 10 may be constituted by the MFP 100 and the IT apparatus 200 that are simply positioned adjacent to each other.

The composite apparatus 10 is provided with the MFP 100, the IT apparatus 200, and one console display 300 that is shared by the MFP 100 and the IT apparatus 200.

To operate independently, the MFP 100 is provided with a system processor 102 and a drawing processor 103. The system processor 102 controls the MFP 100 in a unified manner and is essentially provided with a CPU, a ROM, and a RAM that are not shown in the figure. Under the control of the system processor 102, the MFP 100 receives user events and executes its copier function, printer function, scanner function, and other functions. Furthermore, the system processor 102 makes the console display 300 show display data of the MFP 100 by transmitting a connection request to a switch processor 20, which will be later described in detail.

The drawing processor 103 is provided with a display memory 105 for storing display data 104, which a memory referred to as VRAM. The drawing processor 103 makes the console display 300 show the display data 104 stored on the display memory 105 by transferring the same to the console display 300. The drawing processor 103 creates the display data 104 by combining many display elements stored on the MFP 100, such as operation buttons and messages, and stores the same on the display memory 105. The drawing processor 103 also updates the content of the display memory 105 as the need arises.

Although the MFP 100 is essentially provided with a scanner, an image former, a storage device such as a hard disk drive, and a communication interface for communicating external apparatuses, as well as the system processor 102 and the drawing processor 103, these are omitted from FIG. 1.

Similarly, to operate independently, the IT apparatus 200 is provided with a system processor 202 and a drawing processor 203. The system processor 202 controls the IT apparatus 200 in a unified manner and is essentially provided with a CPU, a ROM, and a RAM that are not shown in the figure. Under the control of the system processor 202, the IT apparatus 200 receives a user event and executes processing in accordance with the user event. Furthermore, the system processor 202 makes the console display 300 show display data of the IT apparatus 200 by transmitting a connection request to the switch processor 20, which will be later described in detail.

The drawing processor 203 is provided with a display memory 205 for storing display data 204. The drawing processor 203 makes the console display 300 show the display data 204 stored on the display memory 205 by transferring the same to the console display 300. The drawing processor 203 creates the display data 204 by combining many display elements stored on the IT apparatus 200, such as operation buttons and messages, and stores the same on the display memory 205. The drawing processor 203 also updates the content of the display memory 205 as the need arises. These control operations will be later described in detail.

Although the IT apparatus 200 is essentially provided with a storage device such as a hard disk drive and a communication interface for communicating external apparatuses, as well as the system processor 202 and the drawing processor 203, these are omitted from FIG. 1.

The console display 300 is a display device constituted by a liquid-crystal display, for example, having a touch panel laminated on its surface. When the user touches a screen, the console display 300 transfers touch information representing the coordinates of the user event to the MFP 100 or the IT apparatus 200. The MFP 100 or the IT apparatus 200 then executes processing in accordance with the coordinates and makes the console display 300 show display data stored on the display memory 105 or the display memory 205 by transferring the same to the console display 300.

In one or more embodiments, the composite apparatus 10 is further provided with a selector 30 and the switch processor 20, which allows the MFP 100 and the IT apparatus 200 to share this only one console display 300.

The selector 30 selectively connects the drawing processor 103 of the MFP 100 or the drawing processor 203 of the IT apparatus 200 to the console display 300. Specifically, when the selector 30 selectively connects the drawing processor 103 of the MFP 100 to the console display 300, the drawing processor 103 makes the console display 300 show the display data 104 stored on the display memory 105 of the MFP 100 by transferring the same to the console display 300 through the selector 30. Subsequently, when the user touches an operation screen of the MFP 100 from the console display 300, the console display 300 transfers touch information to the MFP 100. When the selector 30 selectively connects the drawing processor 203 of the IT apparatus 200 to the console display 300, the drawing processor 203 makes the console display 300 show the display data 204 stored on the display memory 205 of the IT apparatus 200 by transferring the same to the console display 300 through the selector 30. Subsequently, when the user touches an operation screen of the IT apparatus 200 from the console display 300, the console display 300 transfers touch information to the IT apparatus 200.

The switch processor 20 controls the selective connection of the selector 30 depending on from which it receives a connection request, the system processor 102 of the MFP 100 or the system processor 202 of the IT apparatus 200. Specifically, when the switch processor 20 receives a connection request from the system processor 102 of the MFP 100, the switch processor 20 makes the selector 30 connect the drawing processor 103 of the MFP 100 to the console display 300; when the switch processor 20 receives a connection request from the system processor 202 of the IT apparatus 200, the switch processor 20 makes the selector 30 connect the drawing processor 203 of the IT apparatus 20 to the console display 300.

The console display 300 is shared by the MFP 100 and the IT apparatus 200 in the above-mentioned manner. So, in one or more embodiments, the composite apparatus 10 with this one console display 300 is sufficient and useful for users, eliminating the need for one console display 300 for each apparatus; this one console display 300 never occupies a large area of the surface of the composite apparatus 10, retaining the compact body of the composite apparatus 10.

Figure 2:
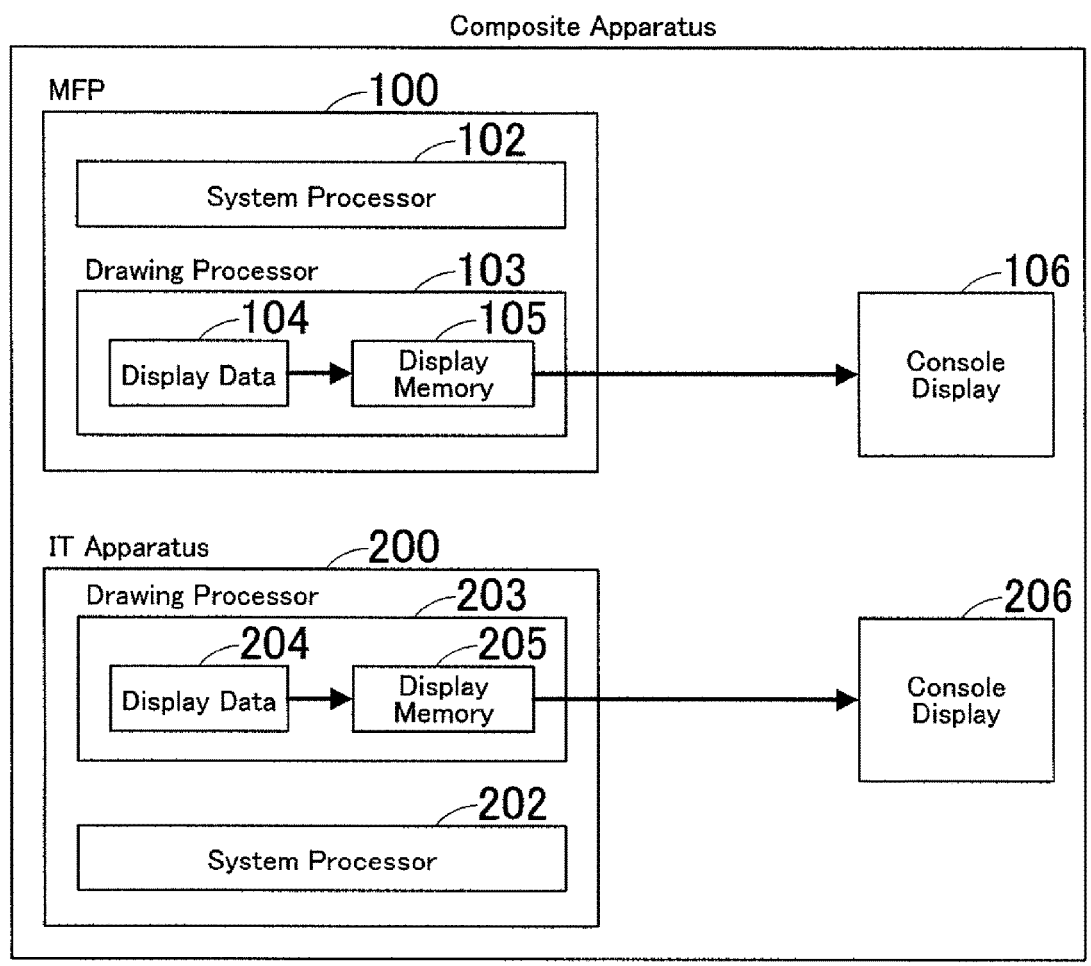
FIG. 2 is a block diagram illustrating the configuration of a composite apparatus according to one or more embodiments of the present invention for comparison.

In contrast, FIG. 2 illustrates one or more embodiments in which the composite apparatus 10 is provided with a console display 106 for the MFP 100 and a console display 206 for the IT apparatus 200. In one or more embodiments, the selector 30 or the switch processor 20 is not required, but users will be bothered by manipulating the MFP 10 and the IT apparatus 200 using the console displays 106 and 206 separately. Furthermore, the console displays 106 and 206 will occupy a large area of the surface of the composite apparatus 10, compromising the compactness of the composite apparatus 10. Even allowing for not requiring the selector 30 or the switch processor 20, one or more embodiments as described in reference to FIG. 2 is less advantageous.

Hereinafter, screens to be displayed on the console display 300 will be described.

Figure 3:
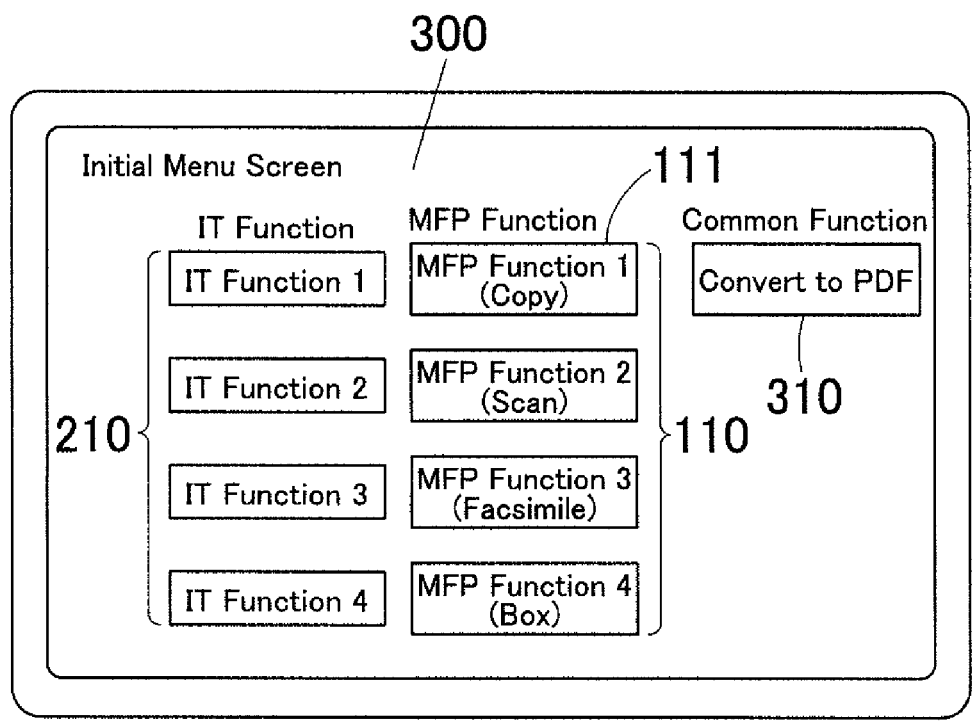
FIG. 3 illustrates an initial menu screen to be displayed on a console display means, in accordance with one or more embodiments of the present invention.

FIG. 3 illustrates an initial menu screen to be displayed on the console display 300 while the composite apparatus 10 is not in use (in the initial state). In this initial menu screen, function buttons each corresponding to a user-accessible function of the IT apparatus 200 and the MFP 100 are shown. In the "IT Functions" column in this screen, listed are the function buttons titled "IT Function 1", "IT Function 2", "IT Function 3", and "IT Function 4"; and these function buttons belong to a function button group 210 for using the functions of the IT apparatus 200. In the "MFP Functions" column, listed are the function buttons titled "MFP Function 1 (Copy)", "MFP Function 2 (Scan)", "MFP Function 3 (Facsimile)", and "MFP Function 4 (Box)"; and these function buttons belong to a function button group 110 for using the following functions of the MFP 100: copier function, scanner function, facsimile function, and box function. Box function is a function that uses a memory area called "box", for example: the function of storing a scanned document in a box and the function of transferring a document from the box to outside.

The user can access any of these functions of the IT apparatus 200 and the MFP 100 by touching the corresponding function button.

If the IP apparatus 200 and the MFP 100 have a function in common, for example, the function of converting an image format file to PDF, the corresponding operation button may be shown both in the "MFP Functions" column and the "IT Functions" column in the initial menu screen. Alternatively, similar to the operation button 310 titled "Convert to PDF" in FIG. 3, one operation button 310 corresponding to the common function may be shown in the screen. In this case, the order of priority on the cause for use is set in advance; when the user touches this one operation button 310, the switch processor 20 makes the selector 30 select either the IT apparatus 200 or the MFP 100 having the cause for use with a higher priority such that the drawing processor 203 or 103 is connected to the console display 300. If the operation button corresponding to the common function is shown both in the "MFP Functions" column and the "IT Functions" column, the user will be confused about which to choose. In one or more embodiments, the user does not have to be confused and can access the function simply by touching this one operation button 310.

As referred to the initial menu screen shown in FIG. 3, the MFP 100 or the IP apparatus 200 is specified as the default apparatus for creating a PDF file. In other words, either of them is specified as the default apparatus to be connected to the console display 300 while the composite apparatus 10 is not in use. The switch processor 20 thus makes the selector 30 select either the MFP 100 or the IT apparatus 200 specified as the default apparatus such that the drawing processor 103 or 203 is connected to the console display 300. In one or more embodiments, while the composite apparatus 10 is not in use, the drawing processor 203 of the IP apparatus 200 is connected to the console display 300 in accordance with the default settings. That is, when the user finishes the MFP 100, the switch processor 20 makes the selector 30 connect the drawing processor 203 of the IP apparatus 200 to the console display 300.

Figure 4:
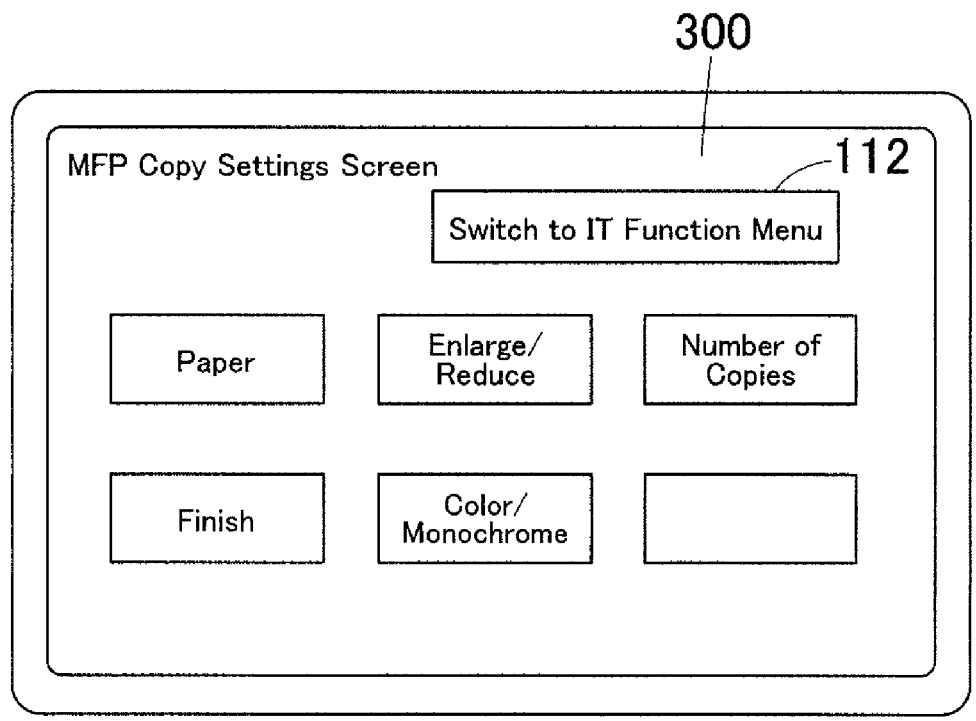
FIG. 4 illustrates a screen to be displayed when the user presses a button titled "MFP Function 1 (Copy)" in the initial menu screen of FIG. 3, in accordance with one or more embodiments of the present invention.

Subsequently, when the user touches the function button 111 titled "MFP Function 1 (Copy)", for example, in the initial menu screen of FIG. 3, the system processor 202 of the IT apparatus 200, for example, transmits a notification of the user event to the system processor 102 of the MFP 100 through the switch processor 20. The drawing processor 103 of the MFP 100 then creates display data i.e. a screen corresponding to the touched button and stores the same on the display memory 105; FIG. 4 illustrates an MFP copy settings screen that is created and stored in this example. After that, the system processor 102 transmits a connection request to the switch processor 20.

Receiving a connection request from the system processor 102 of the MFP 100, the switch processor 20 makes the selector 30 connect the drawing processor 103 of the MFP 100 to the console display 300. The drawing processor 103 of the MFP 100 then transfers the display data from the display memory 105 to the console display 300, making the console display 300 show the MFP copy settings screen of FIG. 4.

Figure 5:
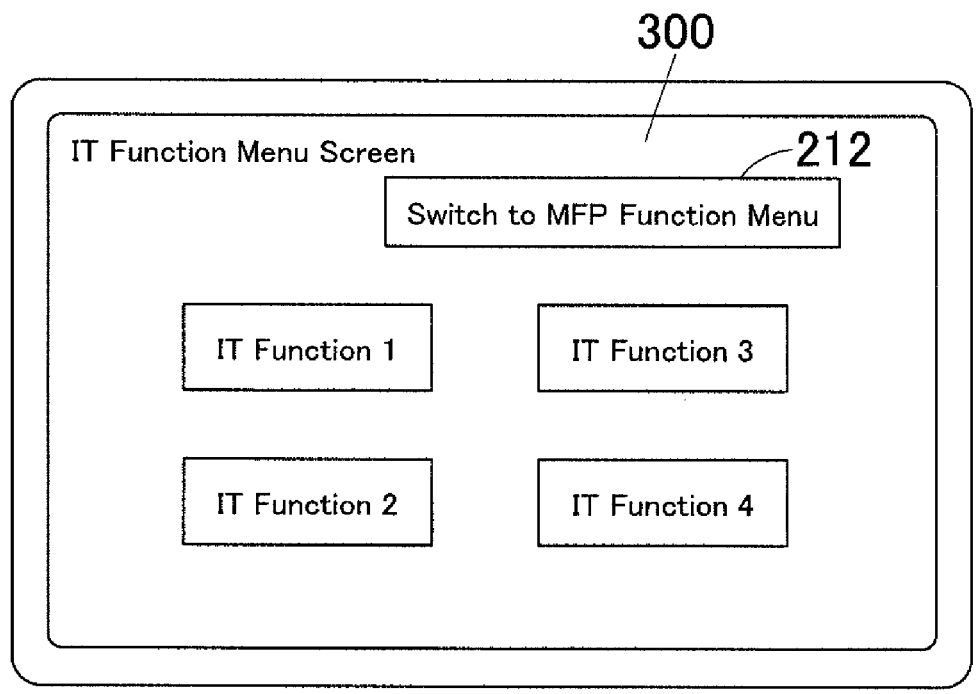
FIG. 5 illustrates a screen to be displayed when the user presses a button titled "Switch to IT Function Menu" in the screen of FIG. 4, in accordance with one or more embodiments of the present invention.

In this MFP copy settings screen, a button 112 titled "Switch to IT Function Menu" is shown as well as the settings button titled "Paper Settings", "Enlarge/Reduce", "Number of Copies", "Finish Settings", and "Color/Monochrome". The button 112 titled "Switch to IT Function Menu" is a button for switching the screen to an IT function menu screen as illustrated in FIG. 5; and it is always shown when a screen of the MFP 100 is displayed on the console display 300. Simply by pressing the button 112 titled "Switch to IT Function Menu", the user can go to the IT function menu screen to access a function of the IT apparatus 200 even while manipulating the MFP 100.

After configuring various settings from the MFP copy settings screen, the user can start copy by the MFP 100 by pressing a Start button that is not shown in the figure. Upon completion of the copy process, the composite apparatus 10 returns to the initial state. Specifically, the system processor 102 of the MFP 100 transmits a notification of the completion of the process to the system processor 202 of the IT apparatus 200 through the switch processor 20. The drawing processor 203 of the IT apparatus 200 then creates display data i.e. an initial menu screen and stores the same on the display memory 205. The switch processor 20 makes the selector 30 connect the drawing processor 203 of the IT apparatus 200 to the console display 300; and the drawing processor 203 of the IT apparatus 200 makes the console display 300 show the initial menu screen of FIG. 3.

Subsequently, when the user touches the button 112 titled "Switch to IT Function Menu" in the MFP copy settings screen of FIG. 4, the system processor 102 of the MFP 100 transmits a notification of the user event to the system processor 202 of the IT apparatus 200 through the switch processor 20. Receiving this notification, the drawing processor 203 of the IT apparatus 200 creates display data i.e. the IT function menu screen of FIG. 5 and stores the same on the display memory 205. After that, the system processor 202 of the IT apparatus 200 transmits a connection request to the switch processor 20; receiving this request, the switch processor 20 makes the selector 30 connect the drawing processor 203 of the IT apparatus 200 to the console display 300. The drawing processor 203 of the IT apparatus 200 then makes the console display 300 show the IT function menu screen of FIG. 5.

Figure 6:
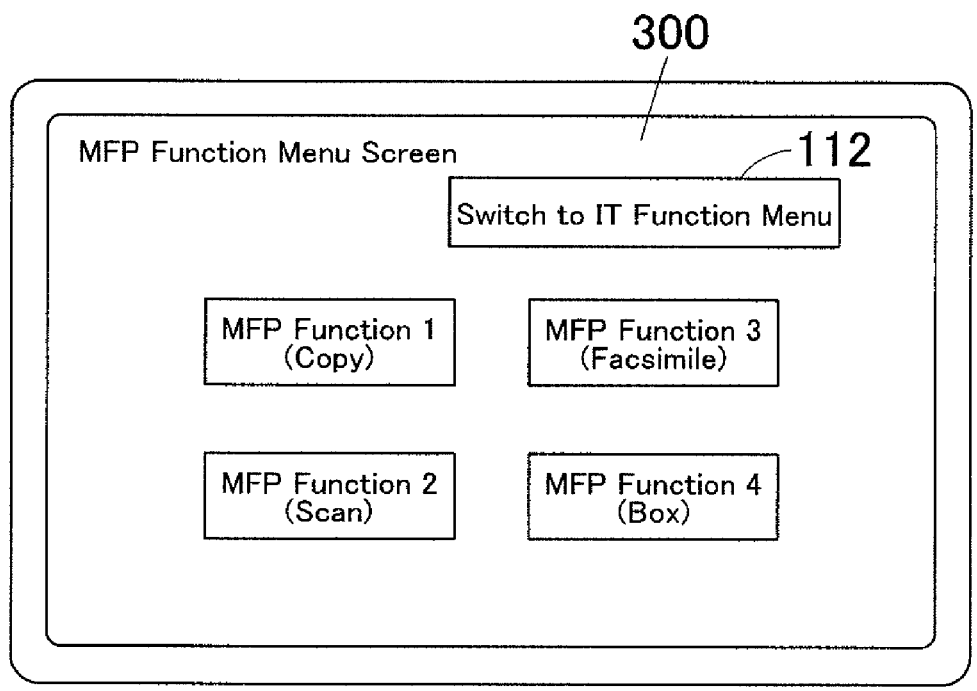
FIG. 6 illustrates a screen to be displayed when the user presses a button titled "Switch to MFP Function Menu" in the screen of FIG. 5, in accordance with one or more embodiments of the present invention.

In this IT function menu screen, a button 212 titled "Switch to MFP Function Menu" is shown as well as the function buttons titled "IT Function 1", "IT Function 2", "IT Function 3", and "IT Function 4". The button 212 titled "Switch to MFP Function Menu" is a button for switching the screen to an MFP function menu screen as illustrated in FIG. 6; and it is always shown when a screen of the IT apparatus 200 is displayed on the console display 300. Simply by pressing the button 212 titled "Switch to MFP Function Menu", the user can go to the MFP function menu screen to access a function of the MFP 100 even while manipulating the IT apparatus 200.

The user can select any of the function buttons in the IT function menu screen, configure various settings from the screen, and start the function. Upon the finish of the function, the drawing processor 203 creates display data i.e. the initial menu screen of FIG. 3 and makes the console display 300 show the initial menu screen. The selector 30 does not work at this time since the drawing processor 203 of the IT apparatus 200 is already connected to the console display 300.

Subsequently, when the user touches the button 212 titled "Switch to MFP Function Menu" in the IT function menu screen, the system processor 202 of the IT apparatus 200 transmits a notification of the user event to the system processor 102 of the MFP 100 through the switch processor 20. Receiving this notification, the drawing processor 103 of the MFP 100 creates display data i.e. the MFP function menu screen of FIG. 6 and stores the same on the display memory 105. After that, the system processor 102 of the MFP 100 transmits a connection request to the switch processor 20; receiving this request, the switch processor 20 makes the selector 30 connect the drawing processor 103 of the MFP 100 to the console display 300. The drawing processor 103 of the MFP 100 then makes the console display 300 show the MFP function menu screen of FIG. 6.

Figure 7:
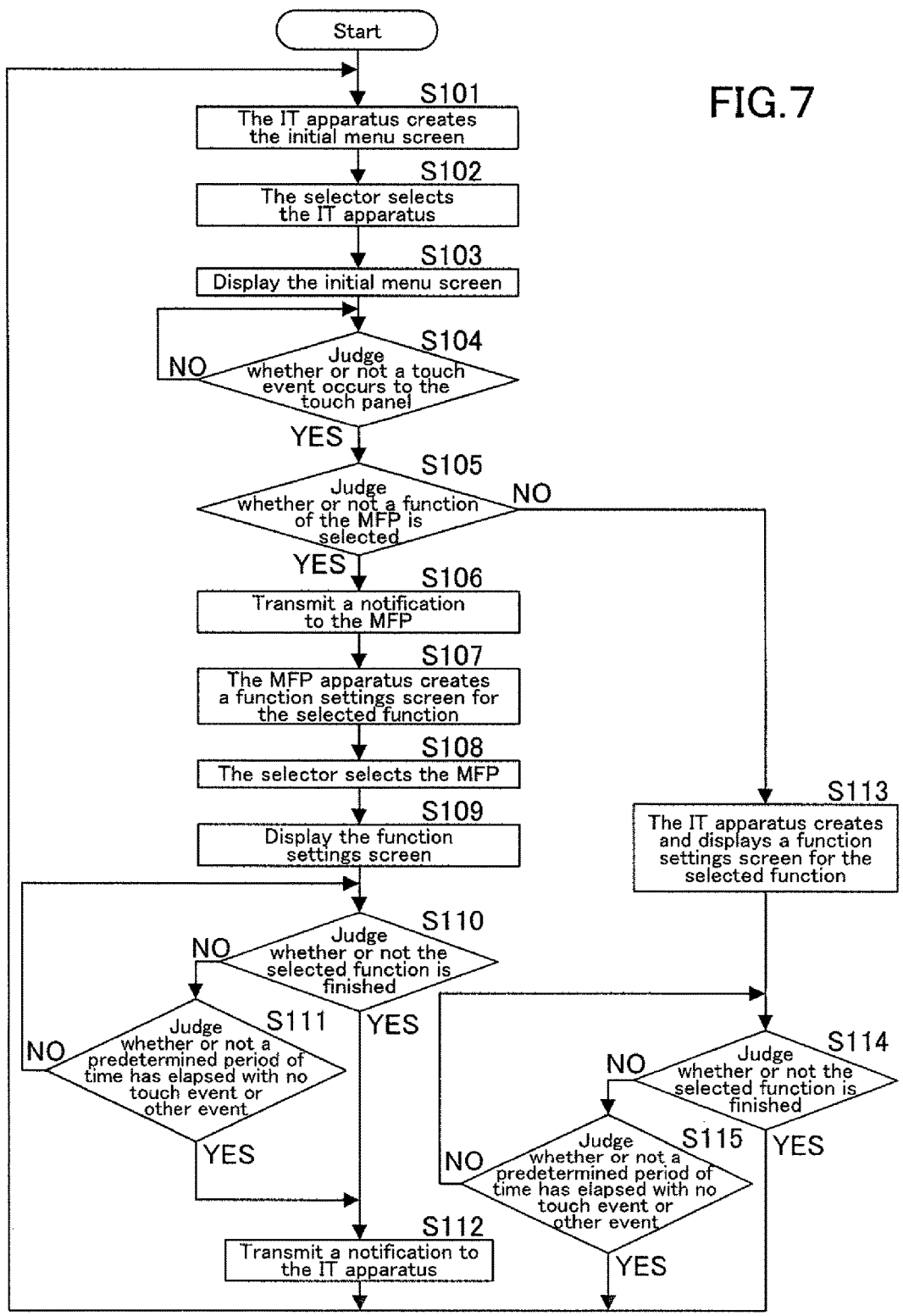
FIG. 7 is a flowchart representing the basic operation of the composite apparatus, in accordance with one or more embodiments of the present invention.

FIG. 7 is a flowchart representing the basic operation of the composite apparatus 10.

In Step S101, the drawing processor 203 of the IT apparatus 200 creates display data i.e. the initial menu screen of FIG. 3 and stores the display data on the display memory (VRAM) 205. In Step S102, the switch processor 20 makes the selector 30 select the IT apparatus 200 in accordance with the default settings such that the drawing processor 203 of the IP apparatus 200 is connected to the console display 300.

In Step S103, the drawing processor 203 of the IT apparatus 200 makes the console display 300 show the display data stored on the display memory 205, which is the initial menu screen. In Step S104, it is judged whether or not a user event occurs to the touch panel of the console display 300. If no user event occurs (NO in Step S104), the routine waits until a user event occurs. If a user event occurs (YES in Step S104), it is further judged in Step S105 whether or not a function of the MFP 100 is selected. If a function of the MFP 100 is selected (YES in Step S105), the routine proceeds to Step S106 in which the system processor 202 of the IT apparatus 200 transmits a notification of the selection to the system processor 102 of the MFP 100 through the switch processor 20. Receiving this notification, in Step S107, the system processor 102 of the MFP 100 makes the drawing processor 103 create a function settings screen for the selected function and transmits a connection request to the switch processor 20.

Figure 8:
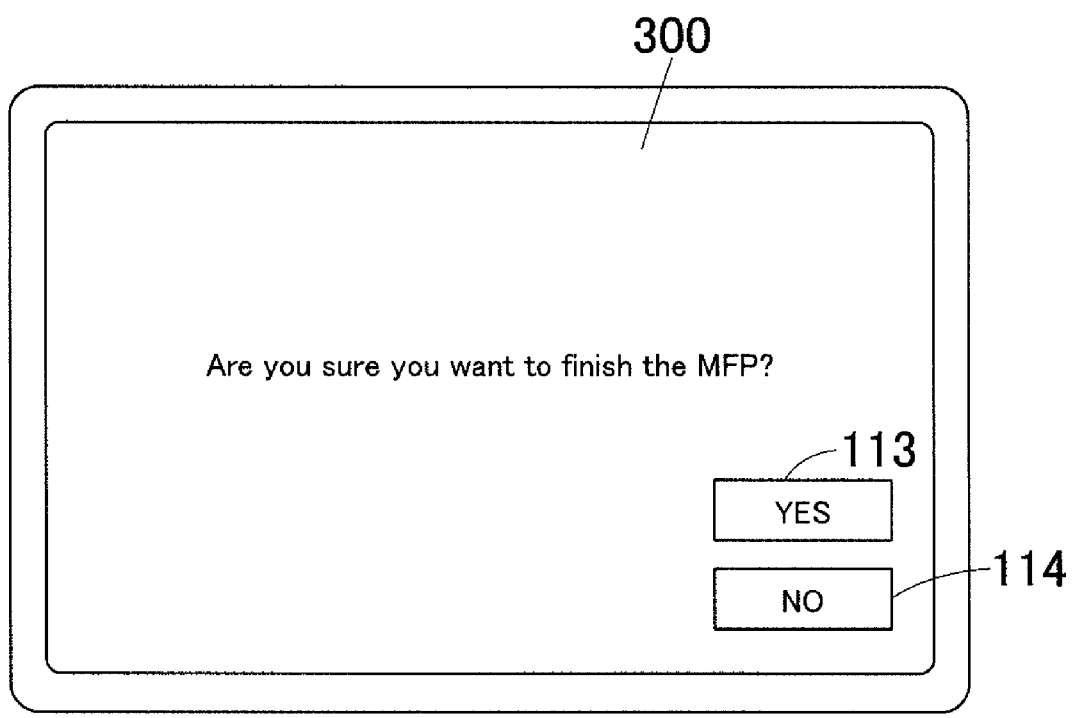
FIG. 8 illustrates a confirmation screen asking the user if he/she really hopes to finish the MFP, in accordance with one or more embodiments of the present invention.

Receiving this connection request, in Step S108, the switch processor 20 makes the selector 30 connect the drawing processor 103 of the MFP 100 to the console display 300. In Step S109, the drawing processor 103 of the MFP 100 makes the console display 300 show the function settings screen. After that, in Step S110, it is judged by the system processor 102 of the MFP 100 whether or not the selected function is finished. Specifically, the judgment whether or not the selected function is finished depends on the user response from a confirmation screen asking the user if he/she really hopes to finish the MFP 100 as illustrated in FIG. 8. It will be judged that the function is finished if the user presses a YES button 113 (an instruction for disconnection); it will be judged that the function is not finished if the user presses a NO button 114.

In Step S110, if the selected function is finished (YES in Step S110), the routine proceeds to Step S112. If the selected function is not finished (NO in Step S110), the routine proceed to Step S111 in which it is judged by the system processor 102 of the MFP 100 whether or not a predetermined period of time has elapsed with no user event to the console display 300 or other event to the MFP 100. If a predetermined period of time has not elapsed (NO in Step S111), the routine returns to Step S110. If a predetermined period of time has elapsed (YES in Step S111), the routine proceeds to Step S112.

In Step S112, the system processor 102 of the MFP 100 transmits a notification to the system processor 202 of the IT apparatus 200 through the switch processor 20; and it is a notification that notifies of the finish of the function or notifies of no user event or other event to the MFP 100 for a predetermined period of time. The routine then returns to Step S101. In this step, the switch processor 20 makes the selector 30 connect the drawing processor 203 of the IT apparatus 200 to the console display 300, and the drawing processor 203 makes the console display 300 show the initial menu screen. If it is a notification that notifies of no user event and no change in the operational state of the MFP 100 for a predetermined period of time, the switch processor 20 discards the connection request from the MFP 100 before the selective connection of the selector 30.

As described above, if a predetermined period of time has elapsed with no user event to the console display 300 or other event to the MFP 100 after the selector 30 connects the drawing processor 103 of the MFP 100 to the console display 300, the connection request from the MFP 100 is discarded, and the selector 30 connects the drawing processor 203 of the IT apparatus 200 specified as the default apparatus to the console display 300. Similarly, if the function of the MFP 100 is finished, the selector 30 connects the drawing processor 203 of the IT apparatus 200 specified as the default apparatus to the console display 300. So, the next user will not have to be bothered by switching the display screen of the console display 300 to the initial menu screen.

Back to Step S105, if a function of the MFP 100 is not selected (NO in Step S105); this means a function of the IT apparatus 200 is selected. So, in Step S113, the drawing processor 203 of the IT apparatus 200 creates a function settings screen for the selected function and makes the console display 300 show the screen. After that, in Step S114, it is judged by the system processor 202 whether or not the selected function is finished. If it is finished (YES in Step S114), the routine returns to Step S101. If the selected function is not finished (NO in Step S114), the routine proceed to Step S115 in which it is judged by the system processor 202 of the IT apparatus 200 whether or not a predetermined period of time has elapsed with no user event or other event to the IT apparatus 200. If a predetermined period of time has not elapsed (NO in Step S115), the routine returns to Step S114. If a predetermined period of time has elapsed (YES in Step S115), the routine returns to Step S101.

As described above, the drawing processor 103 of the MFP 100 and the drawing processor 203 of the IT apparatus 200 create display data for the console display 300, separately. The switch processor 20 makes the selector 30 connect the drawing processor 103 or 203 depending on which apparatus should be used. This allows this one console display 300 to show screens of both the MFP 100 and the IT apparatus 200.

Figure 9:
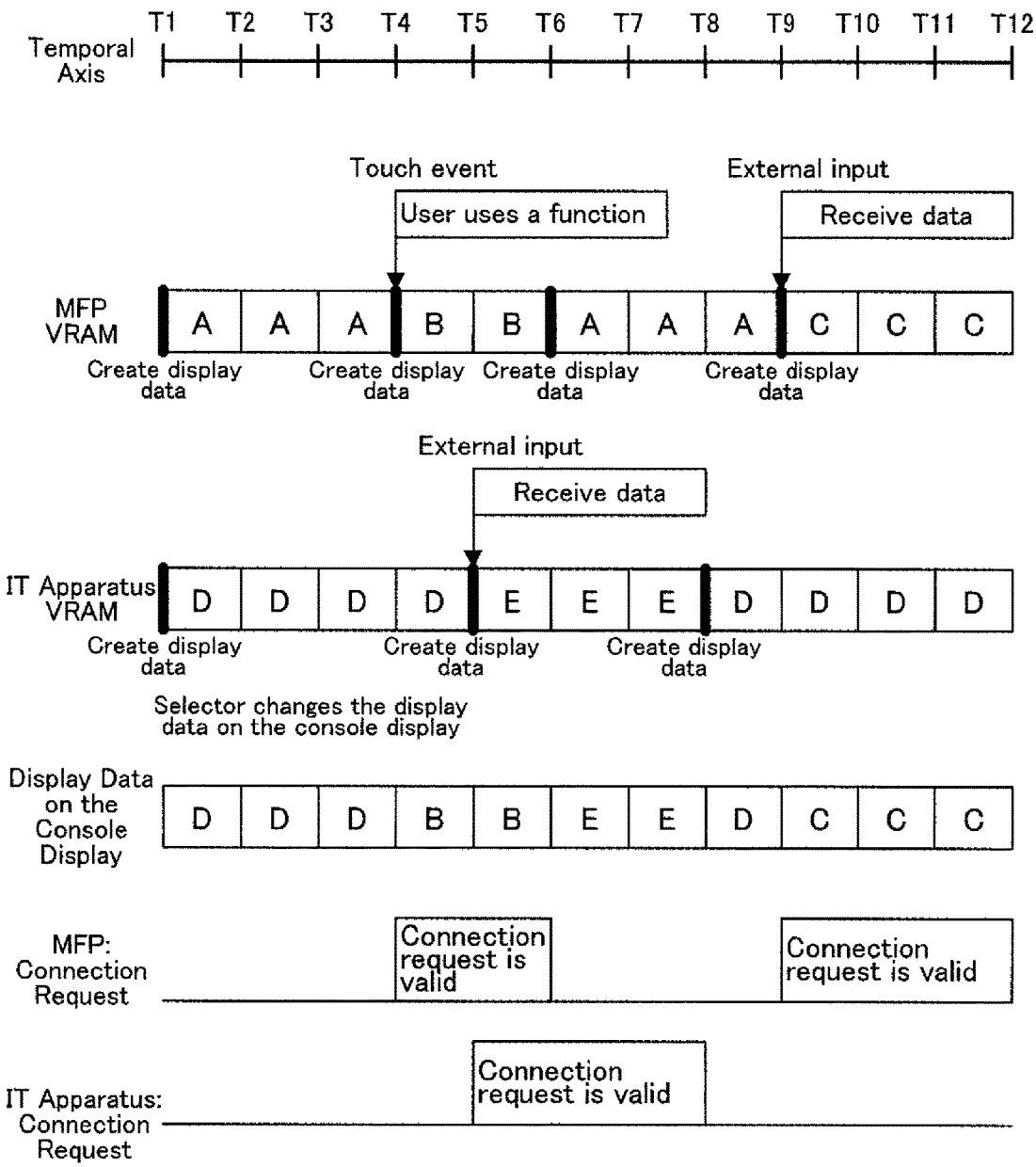
FIG. 9 relates to the composite apparatus of FIG. 1, illustrating an explanatory chart on the timing at which a first apparatus and a second apparatus create display data, in accordance with one or more embodiments of the present invention.

FIG. 9 relates to the composite apparatus 10 of FIG. 1, illustrating an explanatory chart on the timing at which the MFP 100 and the IT apparatus 200 create display data.

The horizontal axis of the charts of FIG. 9 represents a temporal axis. The chart titled "MFP VRAM" indicates the timing at which display data is stored on the display memory 105 of the MFP 100; the chart titled "IT Apparatus VRAM" indicates the timing at which display data is stored on the display memory 205 of the IT apparatus 200. The chart titled "Display Data" indicates the timing at which the console display 300 shows the display data. The chart titled "Connection Request from MFP" indicates the timing at which the MFP 100 issues a connection request; the chart titled "Connection Request from IT apparatus" indicates the timing at which the IT apparatus 200 issues a connection request.

At Time T1, the drawing processor 103 of the MFP 100 creates display data i.e. the MFP function menu screen A of FIG. 6 as the initial screen of the MFP 100 and stores the display data on the display memory 105; meanwhile, the drawing processor 203 of the IT apparatus 200 creates display data i.e. the initial menu screen D of FIG. 3 and stores the display data on the display memory 205.

For the period from Time T1 to T4, there is no connection request from the MFP 100 or the IT apparatus 200. For this period, the selector 30 connects the drawing processor 203 of the IP apparatus 200 to the console display 300 in accordance with the default settings, and thus the console display 300 shows the initial menu screen D of FIG. 3.

At Time T4, a function button on the console display 300, corresponding to a function of the MFP 100, is touched. The MFP 100 then creates display data i.e. an operation screen B specified by the function (for example, the MFP copy settings screen of FIG. 4) and stores the display data on the display memory 105. Subsequently, the MFP 100 transmits a connection request to the switch processor 20.

Receiving a connection request from the MFP 100, the switch processor 20 makes the selector 30 connect the drawing processor 103 of the MFP 100 to the console display 300, and thus the console display 300 shows the operation screen B.

At Time T5, the IT apparatus 200 receives data externally. The drawing processor 203 of the IT apparatus 200 then creates display data i.e. a data reception notifying screen E and stores the display data on the display memory 205. Subsequently, the system processor 202 transmits a connection request to the switch processor 20.

At Time T5, these operations result in a conflict between connection requests from the MFP 100 and the IT apparatus 200. To resolve the conflict, in one or more embodiments, the selector 30 selects either of them in accordance with the order of priority on the cause for connection request which is set in advance. In this example, external data reception is given a higher priority than a user event to an operation screen; in accordance with the order of priority, the switch processor 20 makes the selector 30 continuously select the MFP 100, and thus the console display 300 continuously shows the operation screen B of the MFP 100. As described above, the order of priority on the cause for connection request is set in advance. When connection requests from the MFP 100 and the IT apparatus 200 are conflicting, the switch processor 20 makes the selector 30 select either the MFP 100 or the IT apparatus 200 having issued the connection request including the cause for connection request with a higher priority such that the drawing processor 103 or 203 is connected to the console display 300. That is, the switch processor 20 controls the selective connection appropriately even in the case of a conflict between connection requests from the MFP 100 and the IT apparatus 200.

At Time T6, instructions for the finish of the function of the MFP 100 are given from the console display 300. The connection request from the MFP 100 is then discarded. The switch processor 20 still has the connection request from the IT apparatus 200. So, at Time T6, the switch processor 20 makes the selector 30 select the IT apparatus 200, and thus the console display 300 shows the data reception notifying screen E of the IT apparatus 200.

At Time T8, the IT apparatus 200 finishes the data receiving process. The IT apparatus 200 then withdraws the connection request to the switch processor 20 and creates display data i.e. the initial menu screen D. Now there is no connection request from the MFP 100 or the IT apparatus 200. As in the initial state, the selector 30 connects the drawing processor 203 of the IP apparatus 200 to the console display 300 in accordance with the default settings, and thus the console display 300 shows the initial menu screen D.

At Time T9, the MFP 100 receives data externally. The drawing processor 103 of the MFP 100 then creates display data i.e. a data reception notifying screen C and stores the display data on the display memory 105. Subsequently, the system processor 102 transmits a connection request to the switch processor 20. Receiving this connection request, the switch processor 20 makes the selector 30 select the MFP 100, and thus the console display 300 displays the data reception notifying screen C.

Figure 10:
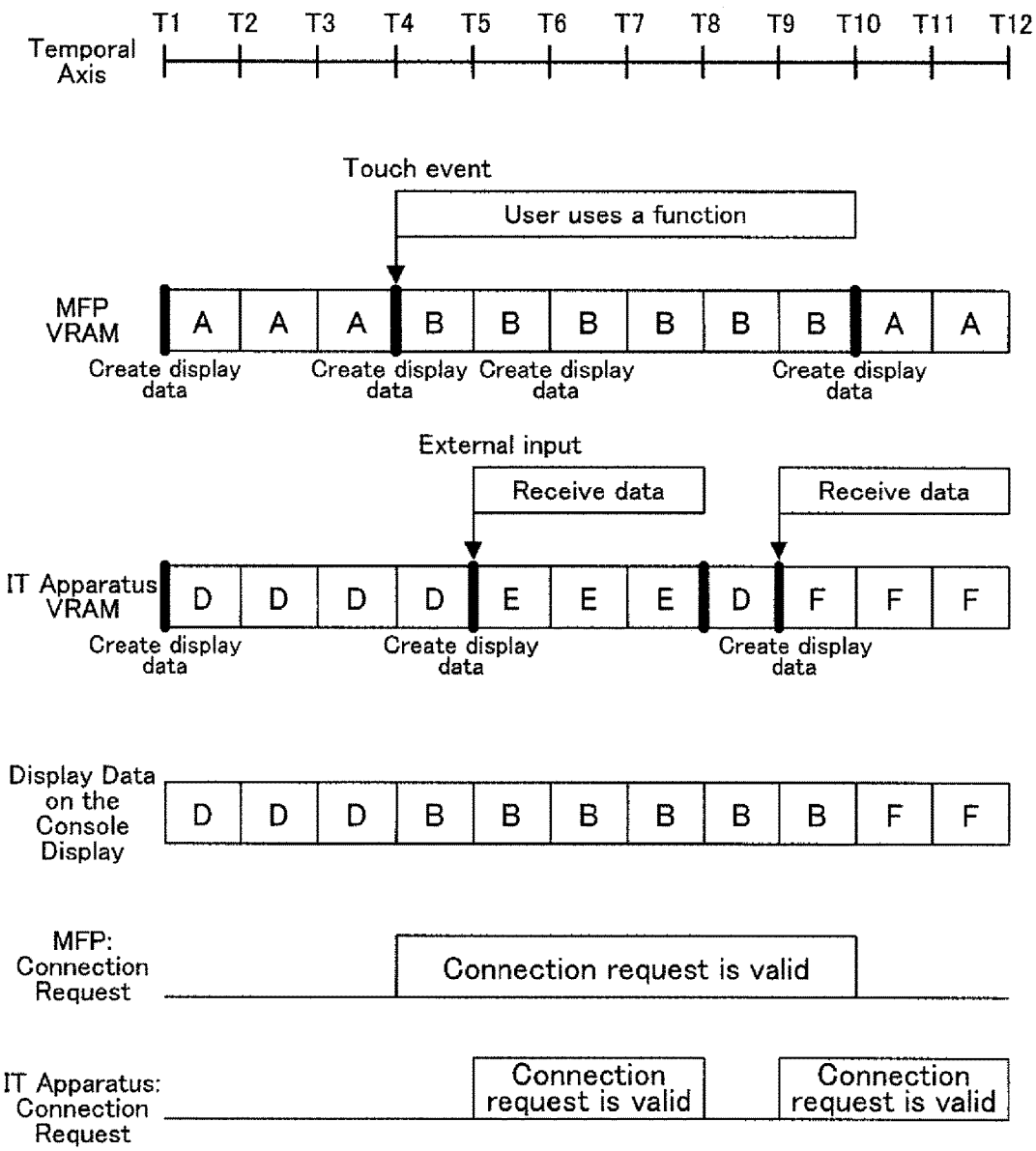
FIG. 10 relates to the composite apparatus of FIG. 1, illustrating another example of the explanatory chart on the timing at which the first apparatus and the second apparatus create display data, in accordance with one or more embodiments of the present invention.

FIG. 10 relates to the composite apparatus 10 of FIG. 1, illustrating another example of the explanatory chart on the timing at which the MFP 100 and the IT apparatus 200 create display data. In the example of FIG. 10, the user uses the function of the MFP 100 from Time T4 to Time T10.

In the example of FIG. 9, the function of the MFP 100 is finished at Time T6. The selector 30 then selects the IT apparatus 200, and thus the console display 300 shows the data reception notifying screen E that is generated by the IT apparatus 200.

In contrast, the function of the MFP 100 is used until Time T10 in the example of FIG. 10. At time T6, the selector 30 continuously connects the drawing processor 103 of the MFP 100 to the console display 300, and thus the console display 300 continuously shows the operation screen B of the MFP 100.

At Time T8, the IT apparatus 200 finishes the data receiving process. The system processor 202 of the IT apparatus 200 then withdraws the connection request, and the drawing processor 203 creates display data i.e. the initial menu screen D. Meanwhile, the function of the MFP 100 is still being used, and the connection request from the MFP 100 is still valid accordingly. At this time, the selector 30 continuously connects the drawing processor 103 of the MFP 100 to the console display 300, and thus the console display 300 continuously shows the operation screen B of the MFP 100.

At Time T9, the IT apparatus 200 again receives data externally. The drawing processor 203 of the IT apparatus 200 then creates display data i.e. the data reception notifying screen E. Subsequently, the system processor 202 transmits a connection request to the switch processor 20. Meanwhile, the function of the MFP 100 is still being used, and the connection request from the MFP 100 is still valid accordingly. Also at Time T9, the selector 30 continuously connects the drawing processor 103 of the MFP 100 to the console display 300, and thus the console display 300 continuously shows the operation screen B of the MFP 100.

At Time T10, the function of the MFP 100 is finished. The system processor 102 of the MFP 100 then withdraws the connection request, and the drawing processor 103 creates display data i.e. the MFP function menu screen A. The switch processor 20 still has the connection request from the system processor 202 of the IT apparatus 200. So, at Time T10, the switch processor 20 makes the selector 30 select the IT apparatus 200, and thus the console display 300 shows a screen F of the IT apparatus 200.

Figure 11A:
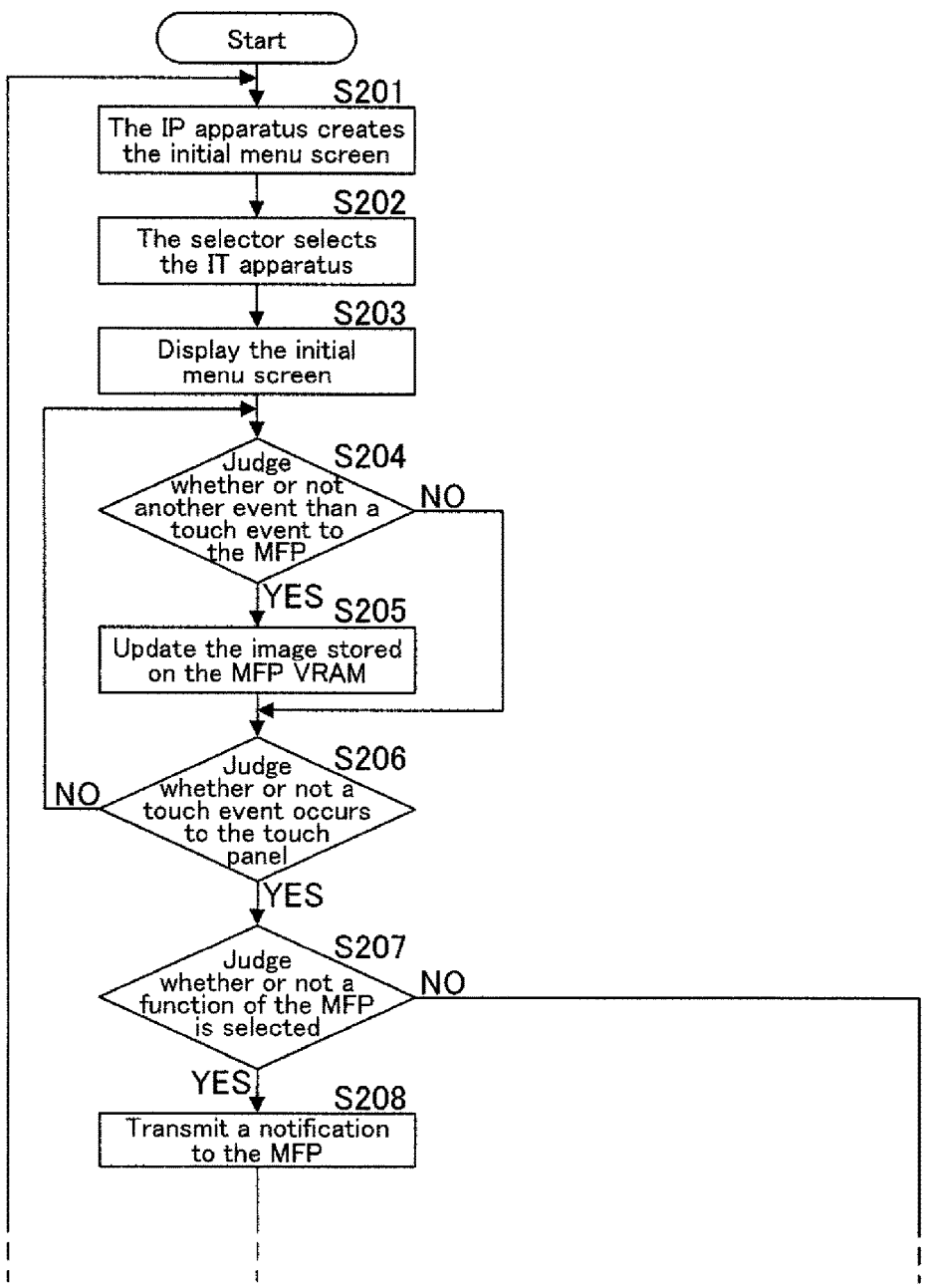
FIG. 11A and FIG. 11B are flowcharts representing another example of the operation of the composite apparatus of FIG. 1, in accordance with one or more embodiments of the present invention.
Figure 11B:
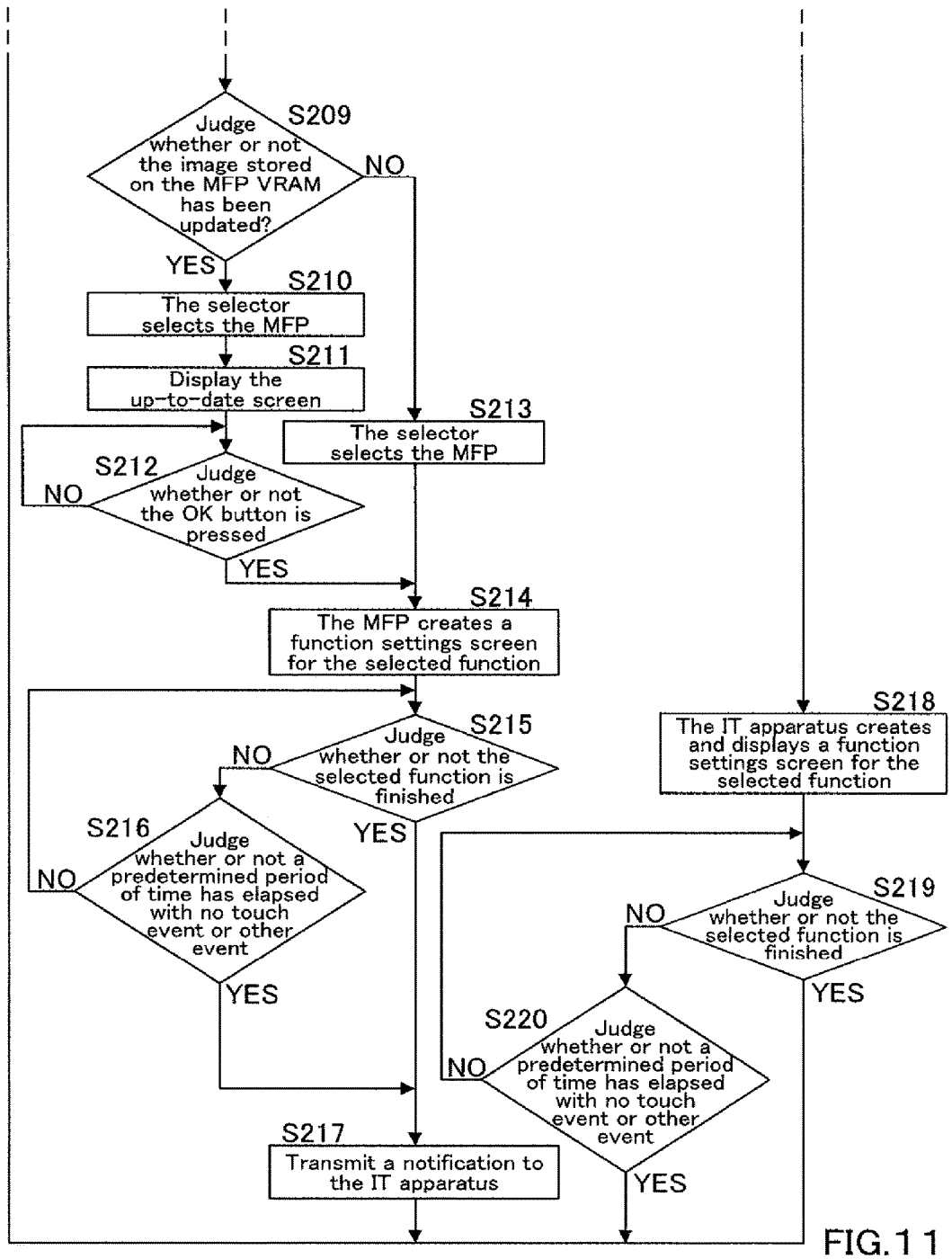

FIG. 11A and FIG. 11B are flowcharts representing another example of the operation of the composite apparatus 10 of FIG. 1. In this example, another event than a user event to the console display 300 occurs to the MFP 100 before the user selects a function button in the initial menu screen, corresponding to a function of the MFP 100.

In Step S201, the drawing processor 203 of the IT apparatus 200 creates display data i.e. the initial menu screen and stores the display data on the display memory (VRAM) 205. In Step S202, the switch processor 20 makes the selector 30 select the IT apparatus 200 in accordance with the default settings such that the drawing processor 203 of the IP apparatus 200 is connected to the console display 300.

In Step S203, the drawing processor 203 of the IT apparatus 200 makes the console display 300 show the display data stored on the display memory 205, which is the initial menu screen. In Step S204, it is judged by the system processor 102 of the MFP 100 whether or not another event than a user event to the console display 300 occurs.

The system processor 102 of the MFP 100 can detect another event than a user event to the console display 300. Specifically, for example, the MFP 100 can detect by a paper feed sensor that a document is set on an automatic document feeder, the MFP 100 can detect by a cover state sensor that a document cover is opened or closed, the MFP 100 can detect by a cassette state sensor that a paper feed cassette is opened or closed, and the MFP 100 can detect by a component state sensor that any other component cover is opened or closed.

The MFP 100 may be provided with an external data input portion for externally receiving data through a facsimile circuit and/or a network circuit; in this case, the MFP 100 can detect by the external data input portion that facsimile data and/or print data is received externally. The MFP 100 may be provided with a connector for interfacing with a portable terminal apparatus such as a smartphone or a tablet computer; in this case, the MFP 100 can detect by the connector that the MFP 100 successfully interfaces with the terminal apparatus. The MFP 100 may be provided with an error sensor for detecting job errors such as a paper jam and a toner empty; in this case, the MFP 100 can detect a job error by the error sensor. The MFP 100 may be provided with a maintenance mode switch for switching the MFP 100 to maintenance mode; in this case, the MFP 100 can detect by the maintenance mode switch that the MFP 100 enters maintenance mode.

In Step S204, another event than a user event to the console display 300 occurs (YES in Step S204), the routine proceeds to Step S205 in which the drawing processor 103 of the MFP 100 creates display data i.e. a screen corresponding to the event that occurred and updates the image (display data) stored on the display memory 105. The routine then proceeds to Step S206. If another event than a user event to the console display 300 does not occur (NO in Step S204), the routine proceeds directly to Step S206.

In Step S206, it is judged whether or not a user event occurs to the touch panel of the console display 300. If no user event occurs (NO in Step S206), the routine returns to Step S204. If a user event occurs (YES in Step S206), it is further judged in Step S207 whether or not a function of the MFP 100 is selected. If a function of the MFP 100 is selected (YES in Step S207), the routine proceeds to Step S208 in which the system processor 202 of the IT apparatus 200 transmits a notification of the selection to the system processor 102 of the MFP 100 through the switch processor 20. In Step S209, upon the reception of this notification, it is judged by the system processor 102 of the MFP 100 whether or not the display data stored on the display memory 102 has been updated.

If the display data has been updated (YES in Step S209), the routine proceeds to Step S210 in which the system processor 102 of the MFP 100 transmits a connection request to the switch processor 20, and the switch processor 20 makes the selector 30 connect the drawing processor 103 of the MFP 100 to the console display 300.

Figure 12:
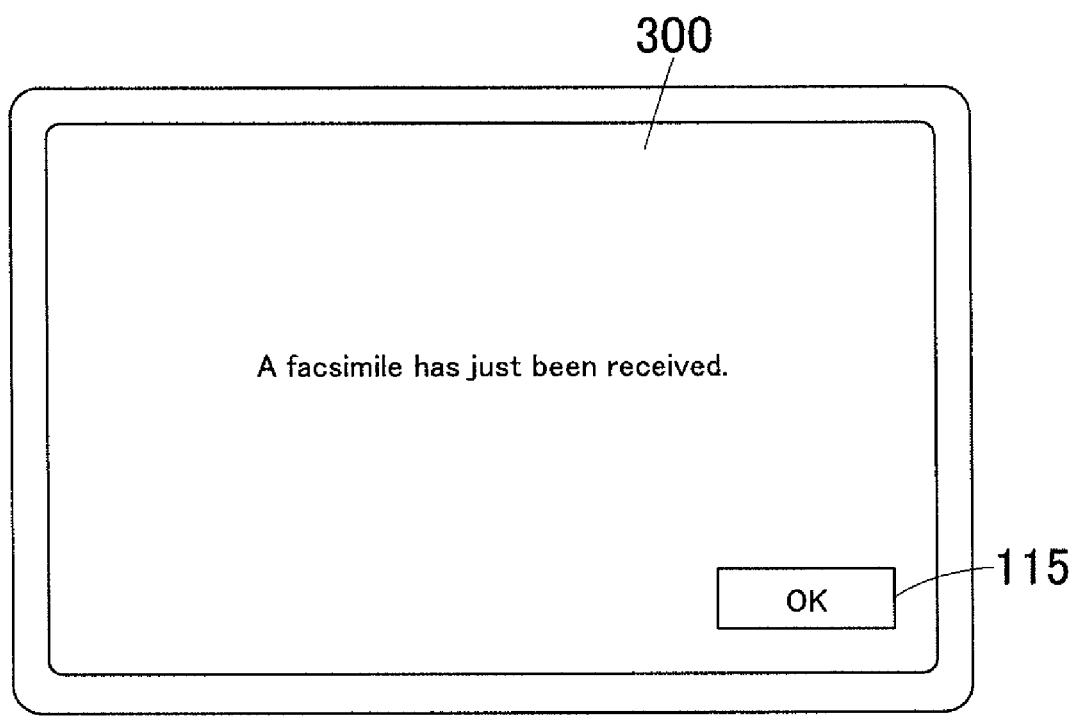
FIG. 12 illustrates a screen on the console display means, showing the up-to-date display data stored on a display memory, in accordance with one or more embodiments of the present invention.

After that, in Step S211, the switch processor 20 makes the console display 300 show the up-to-date display data stored on the display memory 105. For example, if a facsimile has been received completely, the console display 300 shows a message that notifies of the reception of the facsimile, as illustrated in FIG. 12. As well as the message, it also shows an OK button 115. In Step S212, it is further judged whether or not the OK button 115 in the screen of FIG. 12 is pressed. If the OK button 115 is not pressed (NO in Step S212), the routine waits until it is pressed. If the OK button 115 is pressed (YES in Step S212), the routine proceeds to Step S214.

Back to Step S209, If the display data stored on the display memory 105 has not been updated (NO in Step S209), the routine proceeds to Step S213 in which the system processor 102 of the MFP 100 transmits a connection request to the switch processor 20, and the switch processor 20 makes the selector 30 connect the drawing processor 103 of the MFP 100 to the console display 300. The routine then proceeds to Step S214.

In Step S214, the drawing processor 103 of the MFP 100 creates display data i.e. the function settings screen and makes the console display 300 show the display data. After that, in Step S215, it is judged by the system processor 102 of the MFP 100 whether or not the selected function is finished. If the selected function is finished (YES in Step S215), the routine proceeds to Step S217. If the selected function is not finished (NO in Step S215), the routine proceed to Step S216 in which it is judged by the system processor 102 of the MFP 100 whether or not a predetermined period of time has elapsed with no user event or other event to the MFP 100. If a predetermined period of time has not elapsed (NO in Step S216), the routine returns to Step S215. If a predetermined period of time has elapsed (YES in Step S216), the routine proceeds to Step S217.

In Step S217, the system processor 102 of the MFP 100 transmits a notification to the system processor 202 of the IT apparatus 200 through the switch processor 20; and it is a notification that notifies of no user event or other event to the MFP 100 for a predetermined period of time. The routine then returns to Step S201. In this step, the switch processor 20 makes the selector 30 connect the drawing processor 203 of the IT apparatus 200 to the console display 300; and the drawing processor 203 makes the console display 300 show the initial menu screen.

Back to Step S207, if a function of the MFP 100 is not selected (NO in Step S207); this means a function of the IT apparatus 200 is selected. So, in Step S218, the drawing processor 203 of the IT apparatus 200 creates a function settings screen for the selected function and makes the console display 300 show the screen. After that, in Step S219, it is judged by the system processor 202 of the IT apparatus 200 whether or not the selected function is finished. If it is finished (YES in Step S219), the routine returns to Step S201. If the selected function is not finished (NO in Step S219), the routine proceed to Step S220 in which it is judged by the system processor 202 whether or not a predetermined period of time has elapsed with no user event or other event to the IT apparatus 200. If a predetermined period of time has not elapsed (NO in Step S220), the routine returns to Step S219. If a predetermined period of time has elapsed (YES in Step S220), the routine returns to Step S201.

As described above, in one or more embodiments, while the selector 30 selects the IT apparatus 200, the MFP 100 updates the display data stored on the display memory 105 in sync with an event that occurs to the MFP 100 itself. When the selector 30 selects the MFP 100 such that the drawing processor 103 of the MFP 100 is again connected to the console display 300, the drawing processor 103 makes the console display 300 show the up-to-date display data stored on the display memory 105. This allows the user to know the event that most recently occurred to the MFP 100.

Alternatively, in one or more embodiments as described in reference to FIG. 11, while the selector 30 selects the IT apparatus 200, the MFP 100 may retain the display data stored on the display memory 105 without updating the display data in sync with an event that occurs to the MFP 100 itself. In this case, when the selector 30 selects the MFP 100 such that the drawing processor 103 of the MFP 100 is again connected to the console display 300, the drawing processor 103 makes the console display 300 show the display data stored on the display memory 105, which has been retained.

The user may select a function of the MFP 100 via the initial menu screen of FIG. 3 displayed on the console display 300, which allows the user to select from the functions of the MFP 100 and the IT apparatus 200 that constitute the composite apparatus 10; in this case, while the selector 30 selects the MFP 100, the drawing processor 203 of the IT apparatus 200 does not retain the initial menu screen of FIG. 3 stored on the display memory 205 but updates the display data with the screen of FIG. 5 to be displayed when the user presses the button 112 titled "Switch to IT Function Menu" in the MFP function menu screen. That is because a screen of the IT apparatus 200 next will be displayed most likely when the user presses the button 112 titled "Switch to IT Function Menu" in the MFP function menu screen of FIG. 4.

When the selector 30 selects the MFP 100, the display data stored on the display memory 205 of the IT apparatus 200 may be an instant display screen such as a screen notifying that data is being received; in this case, while the selector 30 selects the MFP 100, the drawing processor 203 of the IT apparatus 200 may retain, instead of the instant display screen stored on the display memory 205, the display data having been stored thereon prior to the instant display screen. Similarly, when the selector 30 selects the IT apparatus 200, the display data stored on the display memory 105 of the MFP 100 may be an instant display screen; in this case, while the selector 30 selects the IT apparatus 200, the drawing processor 103 of the MFP 100 may retain, instead of the instant display screen stored on the display memory 105, the display data having been stored thereon prior to the instant display screen.

Figure 13:
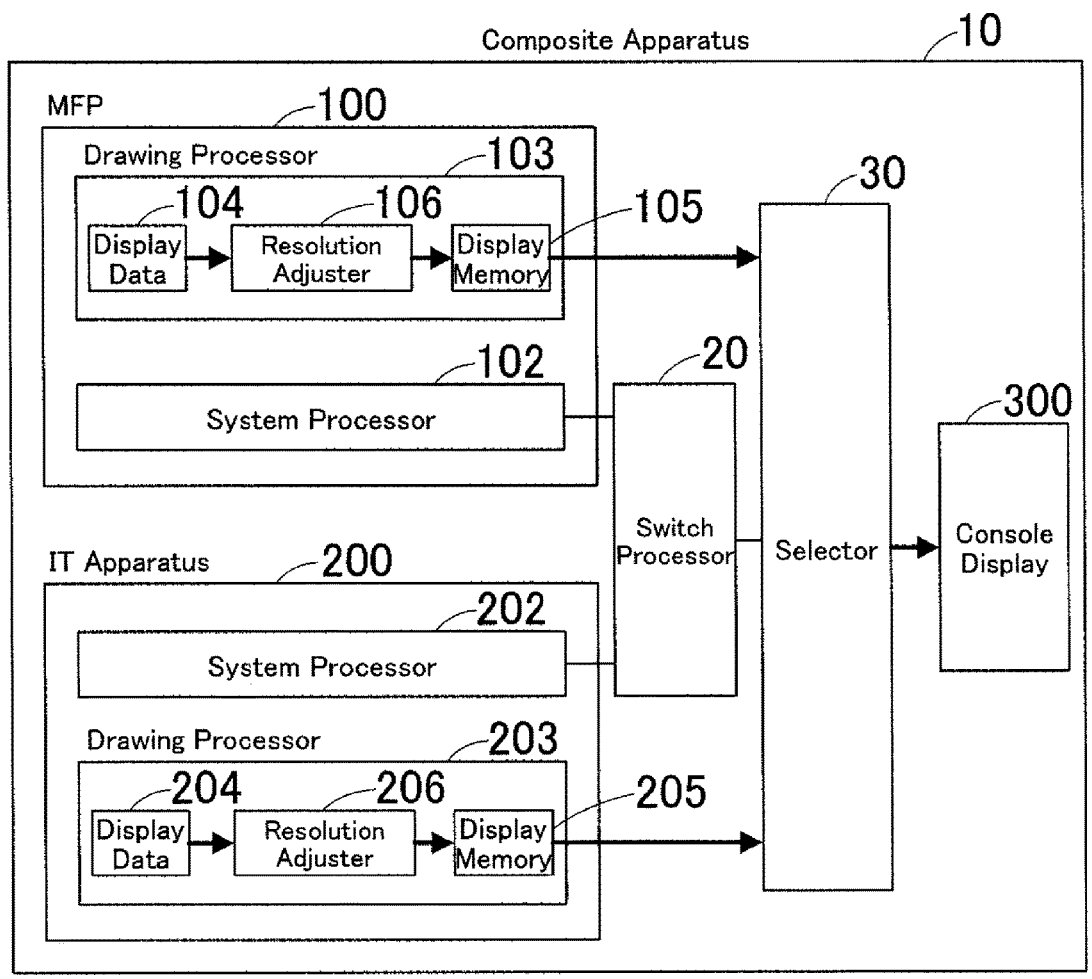
FIG. 13 is a block diagram illustrating the configuration of a composite apparatus according to one or more embodiments of the present invention.

FIG. 13 is a block diagram illustrating the configuration of a composite apparatus 10 according to one or more embodiments of the present invention. In one or more embodiments, this composite apparatus 10 includes this configuration in case that the MFP 100 and/or the IT apparatus 200 are/is incapable of creating display data in the same resolution as that of a console display 300.

Specifically, a drawing processor 103 of the MFP 100 is provided with a resolution adjuster 106 such that, if necessary, the drawing processor 103 makes the resolution adjuster 106 adjust the resolution of the display data 104 before storing it on a display memory 105. As for a drawing processor 203 of the IT apparatus 200, it is also provided with a resolution adjuster 206 such that, if necessary, the drawing processor 203 makes the resolution adjuster 206 adjust the resolution of the display data 204 before storing it on a display memory 205. The configuration of the MFP 100, excluding the resolution adjuster 106, is identical with that in FIG. 1 and the configuration of the IT apparatus 200, excluding the resolution adjuster 206, is identical with that in FIG. 1. While identical elements in this figure are given the same codes as those in FIG. 1, a detailed description of them will be omitted.

Since the MFP 100 and the IT apparatus 200 share this one console display 300, the MFP 100 and the IT apparatus 200 need to create display data in the same resolution as that of the console display 300. Although the MFP 100 and the IT apparatus 200 each are capable of operating independently, the MFP 100 and the IT apparatus 20 may be incapable of creating display data in the same resolution as that of the console display 300. The MFP 100 and the IT apparatus 200 that constitute the composite apparatus 10 may be readily available and common ones; in this case, it is highly likely that the MFP 100 and the IT apparatus 200 are incapable of creating display data in the same resolution as that of the console display 300 because the MFP 100 and the IT apparatus 200 are configured to create display data in resolutions that match the resolutions of their own console displays. If the MFP 100 is incapable of creating display data in the same resolution as that of the console display 300, it is necessary that the MFP 100 adjust the resolution of the display data 104 before storing it on the display memory 105; similarly, if the IT apparatus 200 is incapable of creating display data in the same resolution as that of the console display 300, it is necessary that the IT apparatus 200 adjust the resolution of the display data 204 before storing it on the display memory 205.

As illustrated in FIG. 13, the resolution adjusters 106 and 206 are set in the MFP 100 and the IT apparatus 200, respectively, such that the MFP 100 adjusts the resolution of the display data 104 by the resolution adjuster 106 before storing it on the display memory 105 and the IT apparatus 200 adjusts the resolution of the display data 204 by the resolution adjuster 206 before storing it on the display memory 205.

Figure 14:
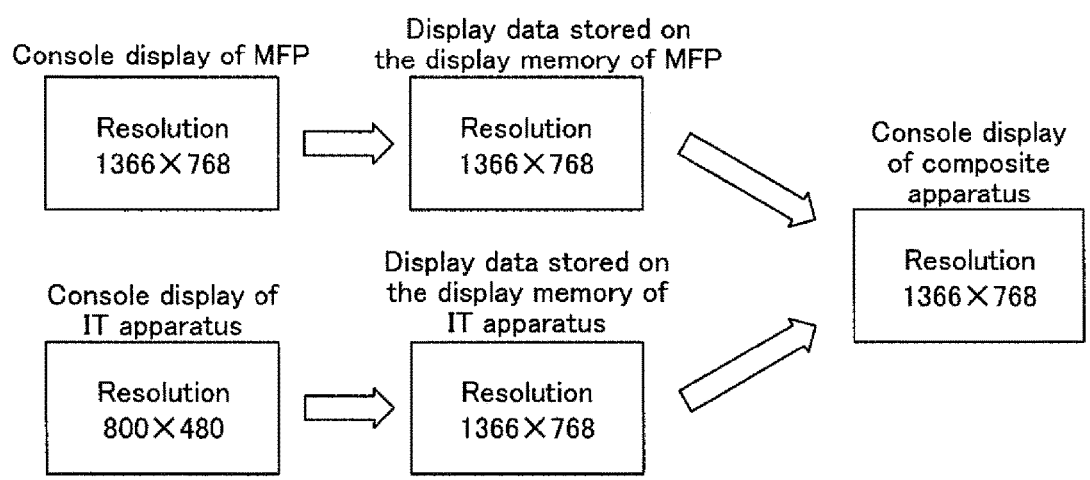
FIG. 14 is an explanatory view on the overview of a resolution adjustment process, in accordance with one or more embodiments of the present invention.

FIG. 14 is an explanatory view on the overview of a resolution adjustment process. In the example of FIG. 14, while the console display 300 of the composite apparatus 10 has a resolution of 1366×768 dots, the resolution of the display data 104 to be stored on the MFP 100 is 1366×768 dots, being exactly the same as that of the console display 300. The drawing processor 103 of the MFP 100 thus stores the display data 104 on the display memory 105 without adjusting the resolution, and makes the console display 300 show the display data 104.

Figure 15:
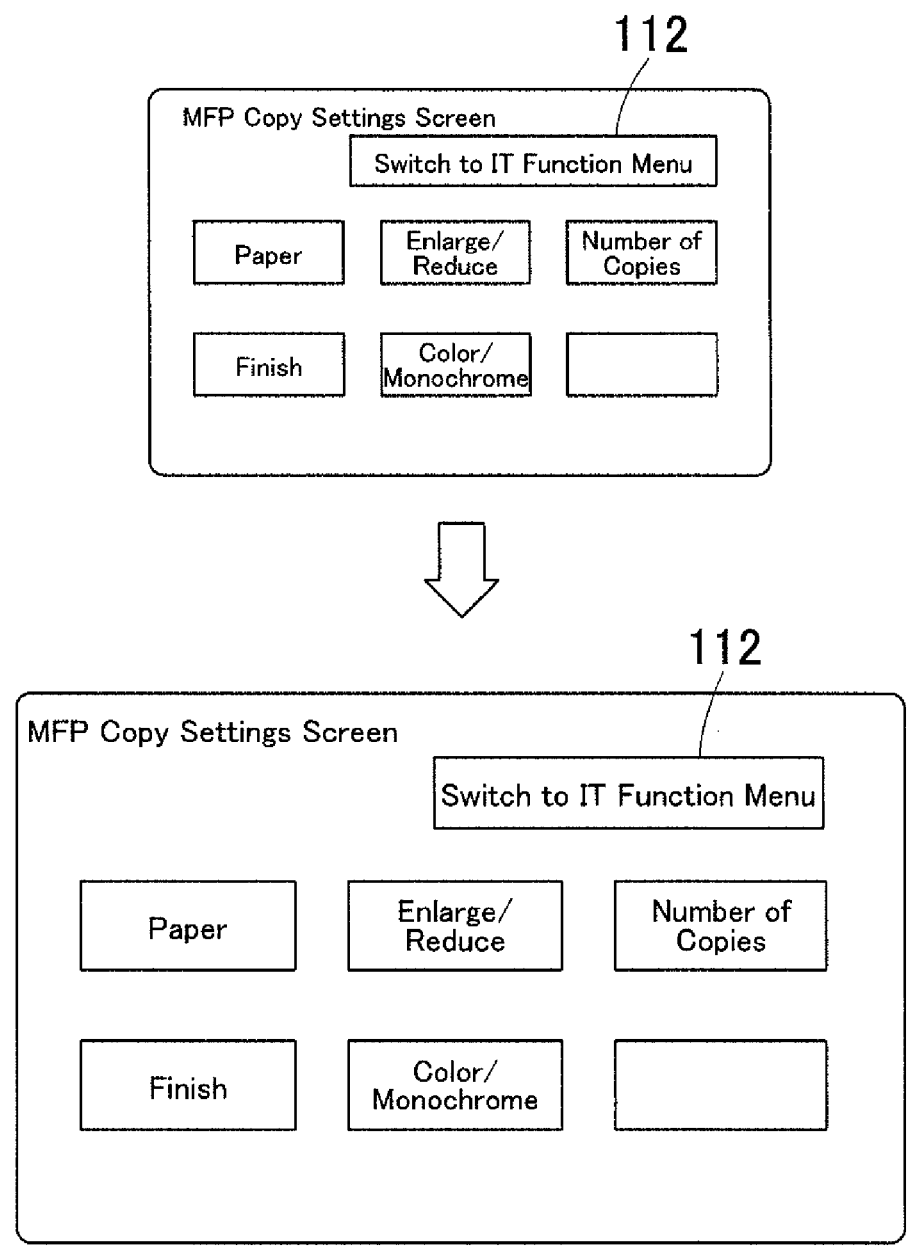
FIG. 15 illustrates an example of a screen subjected to the resolution adjustment process, in accordance with one or more embodiments of the present invention.

Meanwhile, the resolution of the display data 204 to be stored on the IT apparatus 200 is 800×480 dots. The drawing processor 203 of the IT apparatus 200 thus makes the resolution adjuster 206 adjust the resolution to 1366×768 dots, and stores the display data 204 in this adjusted resolution, and then makes the console display 300 show the display data 204. This will be an enlarged screen as illustrated in FIG. 15.

As described above, if the resolution of the MFP 100 is different from that of the console display 300, the MFP 100 adjusts the resolution of display data to that of the console display 300 by the resolution adjuster 106; similarly, if the resolution of the IT apparatus 200 is different from that of the console display 300, the IT apparatus 200 adjusts the resolution of display data to that of the console display 300 by the resolution adjuster 206. This allows the console display 300 to show display data always in an appropriate resolution.

While one or more embodiments of the present invention have been described in detail herein it should be understood that the present invention is not limited to the foregoing embodiments. The present invention is not limited to these embodiments in which a first apparatus and a second apparatus that constitute the composite apparatus 10 are the MFP 100 and the IT apparatus 200, for example. Instead of two apparatuses, three or more apparatuses may constitute the composite apparatus 10 and share this one console display 300.

Although the disclosure has been decribed with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A composite apparatus comprising:
   a first apparatus and a second apparatus that operate independently of each other, the first apparatus and the second apparatus each comprising:
      a display memory that stores display data; and
      a drawing processor;
   a single console display that is shared by the first apparatus and the second apparatus and displays the display data upon an instruction by the drawing processor of the first or second apparatus;
   a selector that selectively connects the drawing processor of the first or second apparatus to the single console display; and
   a switch processor that receives a connection request from the first or second apparatus, wherein the connection request includes a request to connect the drawing processor of the first or second apparatus to the single console display and to instruct the selector to connect the drawing processor of either the first or second apparatus to the single console display,
   wherein, while connected to the single console display, the drawing processor of either the first or second apparatus that issued the connection request instructs the single console display to display the display data, and
   wherein the first apparatus and second apparatus operate independently of each other while sharing the single console display to display the display data.

2. The composite apparatus according to claim 1, wherein:
   the first or second apparatus is an image forming apparatus; and
   the switch processor instructs the selector to connect the drawing processor of the image forming apparatus to the single console display when a function of the image forming apparatus is selected via an operation screen displayed on the single console display, and instructs the selector to disconnect the drawing processor of the image forming apparatus from the single console display when instructions to disconnect the drawing processor of the image forming apparatus is given via an operation screen displayed on the single console display.

3. The composite apparatus according to claim 1, wherein:
a switch button for the selection of the first or second apparatus to connect is displayed in a screen on the single console display,
when the switch button is touched, the switch processor instructs the selector to connect the drawing processor of either the first or second apparatus to the single console display, and
the connection request is issued from either one of the first or the second apparatus.

4. The composite apparatus according to claim 1, wherein:
while the selector selects the first apparatus, the drawing processor of the second apparatus updates the display data stored on the display memory in sync with an event occurring to the second apparatus,
after the display data stored on the display memory is synced, when the selector selects the second apparatus, the drawing processor of the second apparatus instructs the single console display to display the display data stored on the display memory, and
the display data that is displayed on the single console display is an updated display data.

5. The composite apparatus according to claim 4, wherein:
the first or second apparatus is an image forming apparatus; and
the drawing processor of the image forming apparatus updates the display data in sync with an event occurring to a part of the image forming apparatus that excludes the single console display.

6. The composite apparatus according to claim 4, wherein:
the first or second apparatus is an image forming apparatus that comprises a data input portion that externally receives data from at least one of a facsimile circuit and a network circuit; and
the drawing processor of the image forming apparatus updates the display data when the data input portion externally receives data.

7. The composite apparatus according to claim 4, wherein:
the first or second apparatus is an image forming apparatus that comprises an interfacing portion that interfaces with a portable terminal apparatus; and
the drawing processor of the image forming apparatus updates the display data when the interfacing portion successfully interfaces with the portable terminal apparatus.

8. The composite apparatus according to claim 4, wherein:
the first or second apparatus is an image forming apparatus that comprises an error sensor that detects a job error; and
the drawing processor of the image forming apparatus updates the display data when the error sensor detects a job error.

9. The composite apparatus according to claim 4, wherein:
the first or second apparatus is an image forming apparatus that is able to enter a maintenance mode; and
the drawing processor of the image forming apparatus updates the display data when the image forming apparatus enters maintenance mode.

10. The composite apparatus according to claim 1, wherein, while the selector selects the first apparatus, the drawing processor of the second apparatus retains the display data stored on the display memory.

11. The composite apparatus according to claim 10, wherein:
when the selector selects the first apparatus, the display data stored on the display memory of the second apparatus is an instant display screen; and
while the selector selects the first apparatus, the drawing processor of the second apparatus retains, instead of the instant display screen stored on the display memory, display data having been stored thereon prior to the instant display screen.

12. The composite apparatus according to claim 1, wherein:
an order of priority on a cause for connection request is set in advance
when connection requests from the first apparatus and the second apparatus are conflicting, each connection request includes the cause for connection request, the switch processor instructs the selector to connect the drawing processor of either the first or second apparatus to the single console display, and
wherein the connection request that includes the cause of connection request with a higher priority is sent by either one of the first or the second apparatus.

13. The composite apparatus according to claim 1, wherein:
when the selector selects the first apparatus, the display data stored on the display memory of the second apparatus is an initial menu screen that allows a selection from the functions of the first apparatus and the second apparatus; and
while the selector selects the first apparatus, the drawing processor of the second apparatus does not retain the initial menu screen stored on the display memory.

14. The composite apparatus according to claim 1, wherein, if a predetermined period of time has elapsed with no user event to the single console display or events to either the first or second apparatus having issued the connection request, after the selector instructs the drawing processor of either one of the first or second apparatus to connect to the single console display, the switch processor instructs the drawing processor of either one of the first or second apparatus to disconnect from the single console display and instructs the selector to connect the drawing processor of either the first or second apparatus to the single console display, the first or second apparatus that the selector instructs to connect to the single console display is a default apparatus.

15. The composite apparatus according to claim 1, wherein, if the function of either the first or second apparatus that issued the connection request is finished after the selector instructs the drawing processor of either one of the first or second apparatus to connect to the single console display, the selector instructs the drawing processor of either the first or second apparatus to connect to the single console display, the first or second apparatus that the selector instructs to connect to the single console display is a default apparatus.

16. The composite apparatus according to claim 1, wherein:
the first apparatus and the second apparatus each comprise a resolution adjustor that adjusts a resolution of the display data; and
if a resolution of either the first or second apparatus selected by the selector is different from the resolution of the single console display, the resolution adjustor of either the first or second apparatus adjusts the resolution of the display data to that of the single console display, and the drawing processor of either the first or second apparatus instructs the single console display to display the display data in the adjusted resolution.

17. The composite apparatus according to claim 1, wherein:
if the first apparatus and the second apparatus have a common function, one function button corresponding to the common function is displayed in an initial menu screen displayed on the single console display that allows selection from the functions of the first apparatus and the second apparatus;
an order of priority on a cause for use is set in advance; and
when the one function button corresponding to the common function is touched, the switch processor instructs the selector to connect the drawing processor of either the first or second apparatus with the cause for use with a higher priority to the single console display.

* * * * *